(12) United States Patent
Luo et al.

(10) Patent No.: US 11,349,273 B2
(45) Date of Patent: May 31, 2022

(54) APPARATUS FOR TUNING DISCHARGE PERFORMANCE IN A LASER CHAMBER

(71) Applicant: Cymer, LLC, San Diego, CA (US)

(72) Inventors: Edward Siqi Luo, San Diego, CA (US); Richard Carl Ujazdowski, Ramona, CA (US); Shuang Xu, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 129 days.

(21) Appl. No.: 16/962,434

(22) PCT Filed: Dec. 17, 2018

(86) PCT No.: PCT/US2018/065959
§ 371 (c)(1),
(2) Date: Jul. 15, 2020

(87) PCT Pub. No.: WO2019/143433
PCT Pub. Date: Jul. 25, 2019

(65) Prior Publication Data

US 2021/0066880 A1    Mar. 4, 2021

Related U.S. Application Data

(60) Provisional application No. 62/618,168, filed on Jan. 17, 2018, provisional application No. 62/666,310, filed on May 3, 2018.

(51) Int. Cl.
*H01S 3/22* (2006.01)
*H01S 3/038* (2006.01)
(Continued)

(52) U.S. Cl.
CPC .............. *H01S 3/038* (2013.01); *H01S 3/032* (2013.01); *H01S 3/09705* (2013.01);
(Continued)

(58) Field of Classification Search
CPC .... H01S 3/09705; H01S 3/032; H01S 3/1062; H01S 3/225; H01S 3/08004; H01S 3/038
See application file for complete search history.

(56) References Cited

U.S. PATENT DOCUMENTS 4,556,981 A * 12/1985 Cirkel .................... H01S 3/038
372/86
5,048,041 A    9/1991 Akins et al.
(Continued)

FOREIGN PATENT DOCUMENTS

JP    S62181482 A    8/1987
JP    S62243379 A    10/1987
(Continued)

OTHER PUBLICATIONS

Office Action, counterpart Japanese Patent Application No. 2020-535037, dated Sep. 10, 2021, 15 pages total (including English translation of 8 pages).
(Continued)

*Primary Examiner* — Kinam Park
(74) *Attorney, Agent, or Firm* — DiBerardino McGovern IP Group LLC

(57) ABSTRACT

Disclosed is a laser discharge chamber in which useful lifetime is extended by local electrical tuning using one or a combination of design of the chamber internal geometry, placement and distribution of components within the chamber such as electrodes, current returns, and capacitors, and selective electrical isolation of portions of the components.

29 Claims, 11 Drawing Sheets

(51) Int. Cl.
*H01S 3/032* (2006.01)
*H01S 3/097* (2006.01)
*H01S 3/106* (2006.01)
*H01S 3/225* (2006.01)
*H01S 3/08* (2006.01)

(52) U.S. Cl.
CPC ............ *H01S 3/1062* (2013.01); *H01S 3/225* (2013.01); *H01S 3/08004* (2013.01)

(56) References Cited

U.S. PATENT DOCUMENTS

| | | | |
|---|---|---|---|
| 6,377,595 | B1 | 4/2002 | Inoue et al. |
| 6,511,917 | B2 | 1/2003 | Haji et al. |
| 6,735,233 | B2 * | 5/2004 | Osmanow ............... G03F 7/708 372/57 |
| 8,446,928 | B2 * | 5/2013 | Sandstrom ............. H01S 3/038 372/87 |
| 2001/0024463 | A1 * | 9/2001 | Kakizaki ................ H01S 3/038 372/55 |
| 2002/0036461 | A1 * | 3/2002 | Schoenbach ........... H01J 3/025 313/495 |
| 2003/0012234 | A1 | 1/2003 | Watson et al. |
| 2004/0022292 | A1 | 2/2004 | Morton et al. |
| 2004/0066827 | A1 | 4/2004 | Steiger et al. |
| 2006/0221540 | A1 * | 10/2006 | Himori ............. H01J 37/32532 361/234 |
| 2006/0227839 | A1 | 10/2006 | Besaucele et al. |
| 2006/0275156 | A1 * | 12/2006 | Ogawa ................ F04C 29/0085 417/410.5 |
| 2007/0013895 | A1 * | 1/2007 | Okada .................. H02K 41/031 355/72 |
| 2007/0071058 | A1 | 3/2007 | Amada et al. |
| 2014/0266358 | A1 | 9/2014 | Devarajan et al. |

FOREIGN PATENT DOCUMENTS

| | | |
|---|---|---|
| JP | H02103972 A | 4/1990 |
| JP | H05167158 A | 7/1993 |
| JP | 2001168432 A | 6/2001 |
| JP | 2001274493 A | 10/2001 |
| JP | 2007027331 A | 2/2007 |
| RU | 2064720 C1 | 7/1996 |
| WO | 2011081516 A2 | 7/2011 |

OTHER PUBLICATIONS

Office Action, counterpart Korean Patent Application No. 10-2020-7020894, dated Jun. 3, 2021, 11 pages total (including English translation of 4 pages).

Blaine R. Copenheaver, U.S International Searching Authority, International Search Report and Written Opinion, corresponding PCT Application No. PCT/US2018/065959, dated Mar. 1, 2019, 11 pages total.

* cited by examiner

APPARATUS FOR TUNING DISCHARGE PERFORMANCE IN A LASER CHAMBER

CROSS-REFERENCE TO RELATED APPLICATIONS

This application claims priority of U.S. application 62/666,310 which was filed on May 3, 2018 and U.S. application 62/618,168 which was filed on Jan. 17, 2018, each of which are hereby incorporated by reference in their entireties.

FIELD

The present disclosed subject matter relates to laser-generated light sources such as are used for integrated circuit photolithographic manufacturing processes.

BACKGROUND

Excimer lasers are used to generate light in the deep ultraviolet (DUV) portion of the spectrum. For example, DUV excimer laser chambers use pulsed capacitive discharges in an Ar—F2 gas mix to generate 193 nm laser light. The electrodes are typically made of alloys such as brass, which inevitably fluoridates and erodes in the discharge, reducing chamber lifetime. One measure to extend the useful lifetime of a discharge chamber module involves making the anode of a material which does not exhibit wear. Information on materials suitable for use as anode materials can be found, for example, in U.S. Pat. No. 7,301,980, issued Nov. 27, 2007 and U.S. Pat. No. 6,690,706 issued Feb. 10, 2004, both of which are assigned to the assignee of the present application and both of which are hereby incorporated by reference in their entirety. While materials choices succeed in extending the lifetime of the electrode and thus the chamber, there is still a need to extend those lifetimes still further. In this regard see U.S. Pat. No. 8,446,928, issued May 21, 2013 and U.S. Pat. No. 9,246,298 issued Jan. 26, 2016, both of which are assigned to the assignee of the present application and both of which are hereby incorporated by reference in their entireties.

SUMMARY

The following presents a simplified summary of one or more embodiments in order to provide a basic understanding of the present invention. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

According to one aspect, there is disclosed an apparatus comprising a discharge chamber, a first electrode positioned in the discharge chamber, a second electrode positioned in the discharge chamber to create an electrode gap having a height extending between the first and second electrode in a first direction and a length extending in a second direction transverse to the first direction between the first electrode and the second electrode, and a plurality of conductive elements electrically connected to the second electrode, each of the plurality of conductive elements extending substantially in the first direction laterally of the electrode gap, the plurality of conductive elements being arranged in a row extending in the second direction, the plurality of conductive elements comprising a first pair of adjacent conductive elements spaced apart in the second direction at a first spacing and a second pair of adjacent conductive elements being spaced apart in the second direction at a second spacing, the second spacing being larger than the first spacing.

The conductive elements of the plurality of conductive elements may be positioned substantially symmetrically about a midline of the length of the electrode gap. The plurality of conductive elements may comprise a first plurality of conductive elements and a second plurality of conductive elements electrically connected to the second electrode, each of the second plurality of conductive elements extending substantially in the first direction laterally of the electrode gap on a side of the electrode gap opposite to the first plurality of conductive elements, the second plurality of conductive elements being arranged in a second row extending in the second direction, the second plurality of conductive elements comprising third pair of adjacent conductive elements spaced apart in the second direction at the first spacing and a fourth pair of adjacent conductive elements spaced apart in the second direction at the second spacing. The conductive elements of the first plurality of conductive elements may be positioned substantially symmetrically about a midline of the length of the electrode gap and the conductive elements of the second plurality of conductive elements are positioned substantially symmetrically about the midpoint of the length of the electrode gap. The first pair of adjacent conductive elements may be positioned across the electrode gap from the first pair of adjacent conductive elements. A length of the first row and a length of the second row may be substantially coextensive with the length of the electrode gap.

The lateral ends of the second electrode may be electrically isolated. For example, the lateral ends of the second electrode may be electrically isolated from the walls of the discharge chamber or there may be a mechanical linkage mechanically coupled to the second electrode and arranged to move the second electrode and the mechanical linkage may include an insulating element arranged to electrically isolate the second electrode.

According to another aspect there is disclosed an apparatus comprising a discharge chamber, a first electrode positioned in the discharge chamber, the first electrode having a first electrode length extending in a first direction, a second electrode positioned in the discharge chamber, the second electrode having a second electrode length extending in the first direction, the second electrode being arranged in a spaced-apart relation to the first electrode to define an electrode gap between the first electrode and the second electrode, a first plurality of capacitors electrically connected to the first electrode and arranged in a first row extending in the first direction, and a second plurality of capacitors electrically connected to the first electrode and arranged in a second row extending in the first direction parallel to the first row, wherein a number of capacitors in the first plurality is the same as a number of capacitors in the second plurality.

The capacitors of the first plurality of capacitors may be positioned substantially symmetrically about a midline of the length of the electrode gap. The capacitors of the second plurality of capacitors may also positioned substantially symmetrically about a midline of the length of the electrode gap.

According to another aspect there is disclosed an apparatus comprising a discharge chamber, a first electrode positioned in the discharge chamber, the first electrode having a first electrode length extending in a first direction, a second electrode positioned in the discharge chamber, the second electrode having a second electrode length extending in the first direction, the second electrode being arranged in a spaced-apart relation to the first electrode to define an electrode gap between the first electrode and the second electrode, and a plurality of capacitive elements electrically connected to the first electrode and arranged in a first row extending in the first direction, at least one of the capacitive elements in the plurality of capacitive elements having a capacitance value different from at least one other capacitive elements in the plurality of capacitive elements. At least one of the capacitive elements may comprise a pair of capacitors connected in parallel.

According to another aspect there is disclosed an apparatus comprising a discharge chamber, a first electrode positioned in the discharge chamber, the first electrode having a first electrode length extending in a first direction, a second electrode positioned in the discharge chamber, the second electrode having a second electrode length extending in the first direction and being arranged in a spaced-apart relation to the first electrode to define an electrode gap between the first electrode and the second electrode, and a first row of a first number X of capacitors electrically connected to the first electrode and arranged in a first row in a first row direction substantially parallel to the first electrode length, a second row of a second number Y of capacitors electrically connected to the first electrode and arranged in a second row in a second row direction substantially parallel to the first electrode length, wherein X and Y are at least 4 and X is less than Y and wherein a capacitance value of a first capacitor in the second row and a last capacitor in the second row are equal to each other and less than the capacitance value of capacitors in a remainder of the second row.

According to another aspect there is disclosed an apparatus comprising a discharge chamber, a first electrode positioned in the discharge chamber, a second electrode positioned in the discharge chamber to create an electrode gap having a height extending between the first and second electrode in a first direction and a length extending in a second direction transverse to the first direction between the first electrode and the second electrode, a first plurality of conductive elements electrically connected to the second electrode, each of the plurality of conductive elements extending substantially in the first direction laterally of the electrode gap, the plurality of conductive elements being arranged in a row extending in the second direction, the plurality of conductive elements comprising a first pair of adjacent conductive elements spaced apart in the second direction at a first spacing and a second pair of adjacent conductive elements being spaced apart in the second direction at a second spacing, the second spacing being larger than the first spacing, second plurality of conductive elements electrically connected to the second electrode, each of the second plurality of conductive elements extending substantially in the first direction laterally of the electrode gap on a side of the electrode gap opposite to the first plurality of conductive elements, the second plurality of conductive elements being arranged in a second row extending in the second direction, the second plurality of conductive elements comprising a third pair of adjacent conductive elements spaced apart in the second direction at the first spacing and a fourth pair of adjacent conductive elements spaced apart in the second direction at the second spacing, a first plurality of capacitors electrically connected to the first electrode and arranged in a first row extending in the first direction, and a second plurality of capacitors electrically connected to the first electrode and arranged in a second row extending in the first direction parallel to the first row, at least one of the capacitors in the second plurality of capacitors having a capacitance value different from at least one other capacitor in the second plurality of capacitors.

The first pair of adjacent conductive elements may be positioned across the electrode gap from the third pair of adjacent conductive elements. A length of the first row and a length of the second row may be substantially coextensive with the length of the electrode gap. The conductive elements of the first plurality of conductive elements may be positioned substantially symmetrically about a midline of the length of the electrode gap. The conductive elements of the first plurality of conductive elements may be positioned substantially symmetrically about a midline of the length of the electrode gap and the conductive elements of the second plurality of conductive elements are positioned substantially symmetrically about the midpoint of the length of the electrode gap. The capacitors of the first plurality of capacitors may be positioned substantially symmetrically about a midline of the length of the electrode gap. The capacitors of the second plurality of capacitors may also positioned substantially symmetrically about a midline of the length of the electrode gap.

Further embodiments, features, and advantages of the present invention, as well as the structure and operation of the various embodiments are described in detail below with reference to accompanying drawings.

BRIEF DESCRIPTION OF THE DRAWINGS

The accompanying drawings, which are incorporated herein and form part of the specification, illustrate the methods and systems of embodiments of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements.

DETAILED DESCRIPTION

Figure 1:
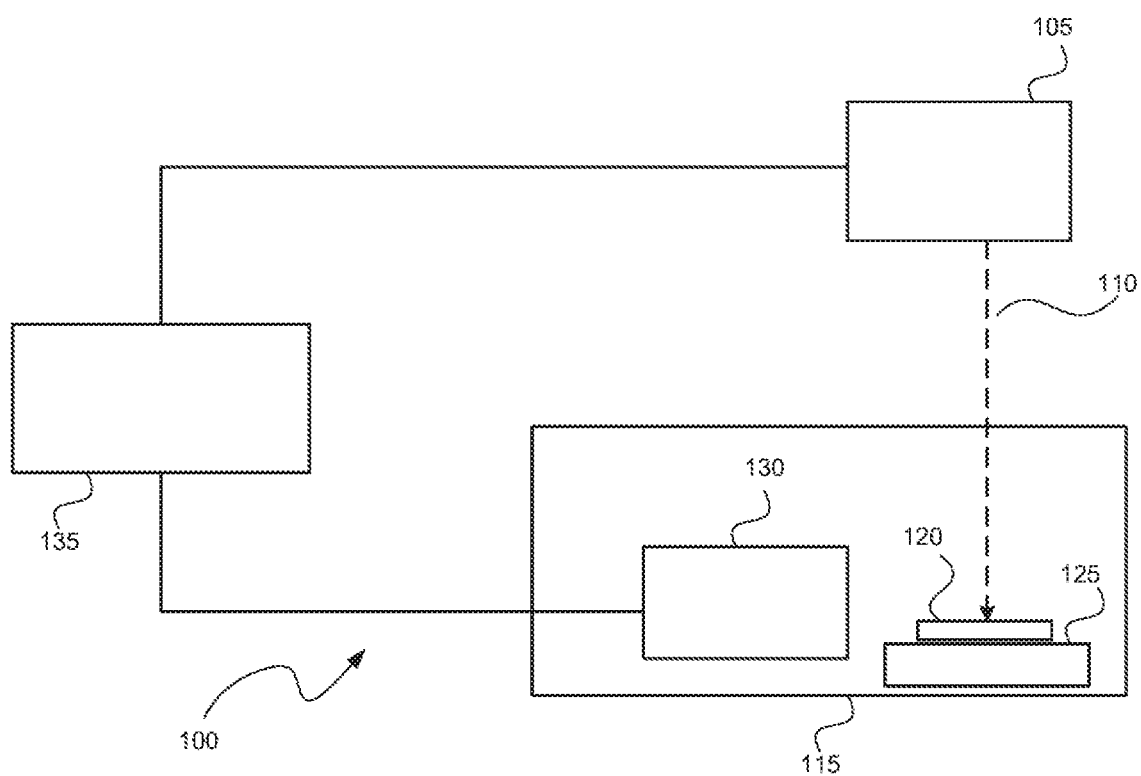
FIG. 1 shows a schematic, not to scale, view of an overall broad conception of a photolithography system according to an aspect of the disclosed subject matter.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments.

Referring to FIG. 1, a photolithography system 100 that includes an illumination system 105. As described more fully below, the illumination system 105 includes a light source that produces a pulsed light beam 110 and directs it to a photolithography exposure apparatus or scanner 115 that patterns microelectronic features on a wafer 120. The wafer 120 is placed on a wafer table 125 constructed to hold wafer 120 and connected to a positioner configured to accurately position the wafer 120 in accordance with certain parameters.

The photolithography system 100 uses a light beam 110 having a wavelength in the deep ultraviolet (DUV) range, for example, with wavelengths of 248 nanometers (nm) or 193 nm. The minimum size of the microelectronic features that can be patterned on the wafer 120 depends on the wavelength of the light beam 110, with a lower wavelength resulting in a smaller minimum feature size. When the wavelength of the light beam 110 is 248 nm or 193 nm, the minimum size of the microelectronic features can be, for example, 50 nm or less. The bandwidth of the light beam 110 can be the actual, instantaneous bandwidth of its optical spectrum (or emission spectrum), which contains information on how the optical energy of the light beam 110 is distributed over different wavelengths. The scanner 115 includes an optical arrangement having, for example, one or more condenser lenses, a mask, and an objective arrangement. The mask is movable along one or more directions, such as along an optical axis of the light beam 110 or in a plane that is perpendicular to the optical axis. The objective arrangement includes a projection lens and enables the image transfer to occur from the mask to the photoresist on the wafer 120. The illumination system 105 adjusts the range of angles for the light beam 110 impinging on the mask. The illumination system 105 also homogenizes (makes uniform) the intensity distribution of the light beam 110 across the mask.

The scanner 115 can include, among other features, a lithography controller 130, air conditioning devices, and power supplies for the various electrical components. The lithography controller 130 controls how layers are printed on the wafer 120. The lithography controller 130 includes a memory that stores information such as process recipes. A process program or recipe determines the length of the exposure on the wafer 120 based on, for example, the mask used, as well as other factors that affect the exposure. During lithography, a plurality of pulses of the light beam 110 may illuminate the same area of the wafer 120 to constitute an illumination dose.

The photolithography system 100 also preferably includes a control system 135. In general, the control system 135 includes one or more of digital electronic circuitry, computer hardware, firmware, and software. The control system 135 also includes memory which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks.

The control system 135 can also include one or more input devices (such as a keyboard, touch screen, microphone, mouse, hand-held input device, etc.) and one or more output devices (such as a speaker or a monitor). The control system 135 also includes one or more programmable processors, and one or more computer program products tangibly embodied in a machine-readable storage device for execution by one or more programmable processors. The one or more programmable processors can each execute a program of instructions to perform desired functions by operating on input data and generating appropriate output. Generally, the processors receive instructions and data from the memory. Any of the foregoing may be supplemented by, or incorporated in, specially designed ASICs (application-specific integrated circuits). The control system 135 can be centralized or be partially or wholly distributed throughout the photolithography system 100.

Figure 2:
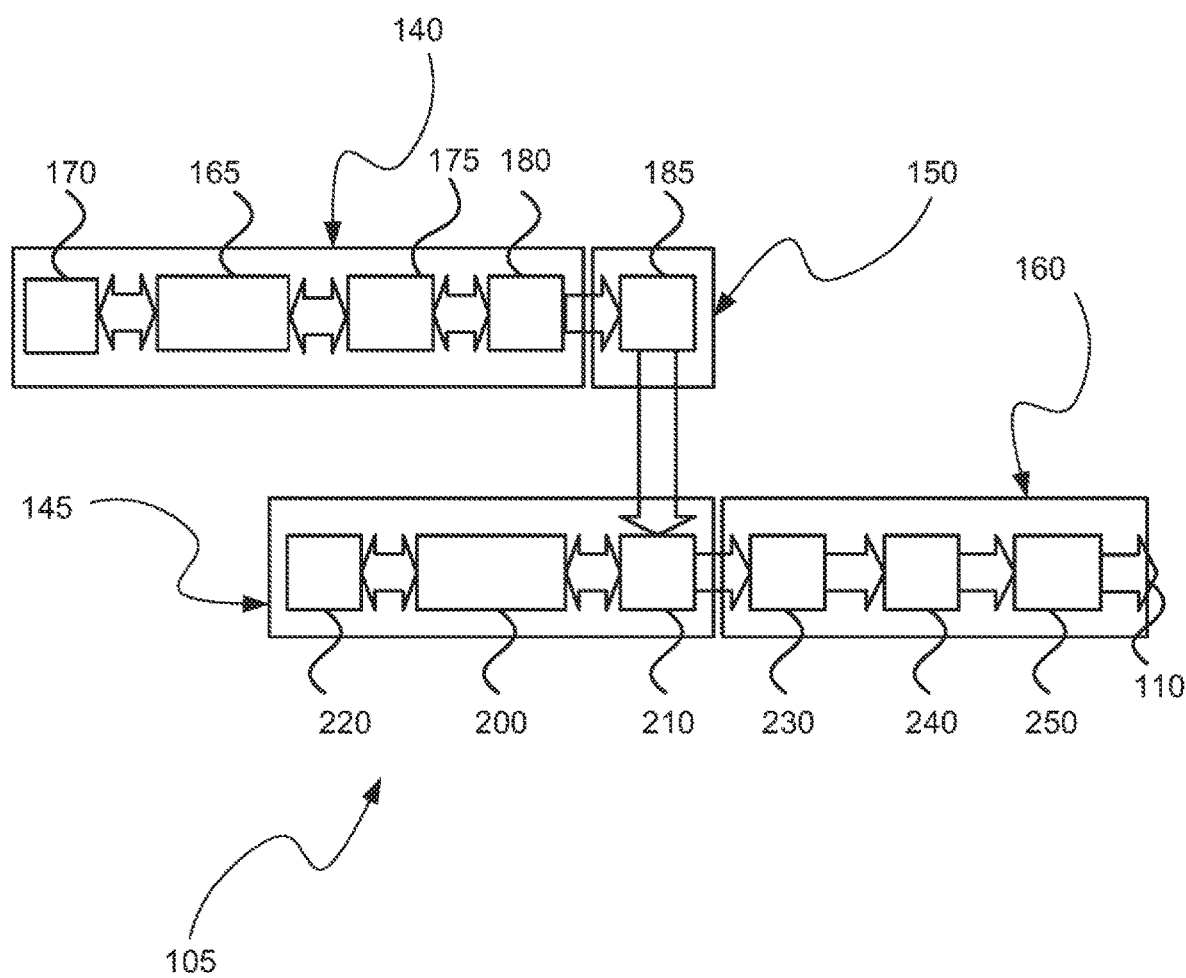
FIG. 2 shows a schematic, not to scale, view of an overall broad conception of an illumination system according to an aspect of the disclosed subject matter.

Referring to FIG. 2, an exemplary illumination system 105 is a pulsed laser source that produces a pulsed laser beam as the light beam 110. FIG. 2 shows illustratively and in block diagram a gas discharge laser system according to an embodiment of certain aspects of the disclosed subject matter. The gas discharge laser system may include, e.g., a solid state or gas discharge seed laser system 140, an amplification stage, e.g., a power ring amplifier ("PRA") stage 145, relay optics 150 and laser system output subsystem 160. The seed system 140 may include, e.g., a master oscillator ("MO") chamber 165.

The seed laser system 140 may also include a master oscillator output coupler ("MO OC") 175, which may comprise a partially reflective mirror, forming with a reflective grating (not shown) in a line narrowing module ("LNM") 170, an oscillator cavity in which the seed laser 140 oscillates to form the seed laser output pulse, i.e., forming a master oscillator ("MO"). The system may also include a line-center analysis module ("LAM") 180. The LAM 180 may include an etalon spectrometer for fine wavelength measurement and a coarser resolution grating spectrometer.

A MO wavefront engineering box ("WEB") 185 may serve to redirect the output of the MO seed laser system 140 toward the amplification stage 145, and may include, e.g., beam expansion with, e.g., a multi prism beam expander (not shown) and coherence busting, e.g., in the form of an optical delay path (not shown).

The amplification stage 145 may include, e.g., a PRA lasing chamber 200, which may also be an oscillator, e.g., formed by seed beam injection and output coupling optics (not shown) that may be incorporated into a PRA WEB 210 and may be redirected back through the gain medium in the chamber 200 by a beam reverser 220. The PRA WEB 210 may incorporate a partially reflective input/output coupler (not shown) and a maximally reflective mirror for the nominal operating wavelength (e.g., at around 193 nm for an ArF system) and one or more prisms.

A bandwidth analysis module ("BAM") 230 at the output of the amplification stage 145 may receive the output laser light beam of pulses from the amplification stage and pick off a portion of the light beam for metrology purposes, e.g., to measure the output bandwidth and pulse energy. The laser output light beam of pulses then passes through an optical pulse stretcher ("OPuS") 240 and an output combined autoshutter metrology module ("CASMM") 250, which may also be the location of a pulse energy meter. One purpose of the OPuS 240 may be, e.g., to convert a single output laser pulse into a pulse train. Secondary pulses created from the original single output pulse may be delayed with respect to each other. By distributing the original laser pulse energy into a train of secondary pulses, the effective pulse length of the laser can be expanded and at the same time the peak pulse intensity reduced. The OPuS 240 can thus receive the laser beam from the PRA WEB 210 via the BAM 230 and direct the output of the OPuS 240 to the CASMM 250.

Figure 3:
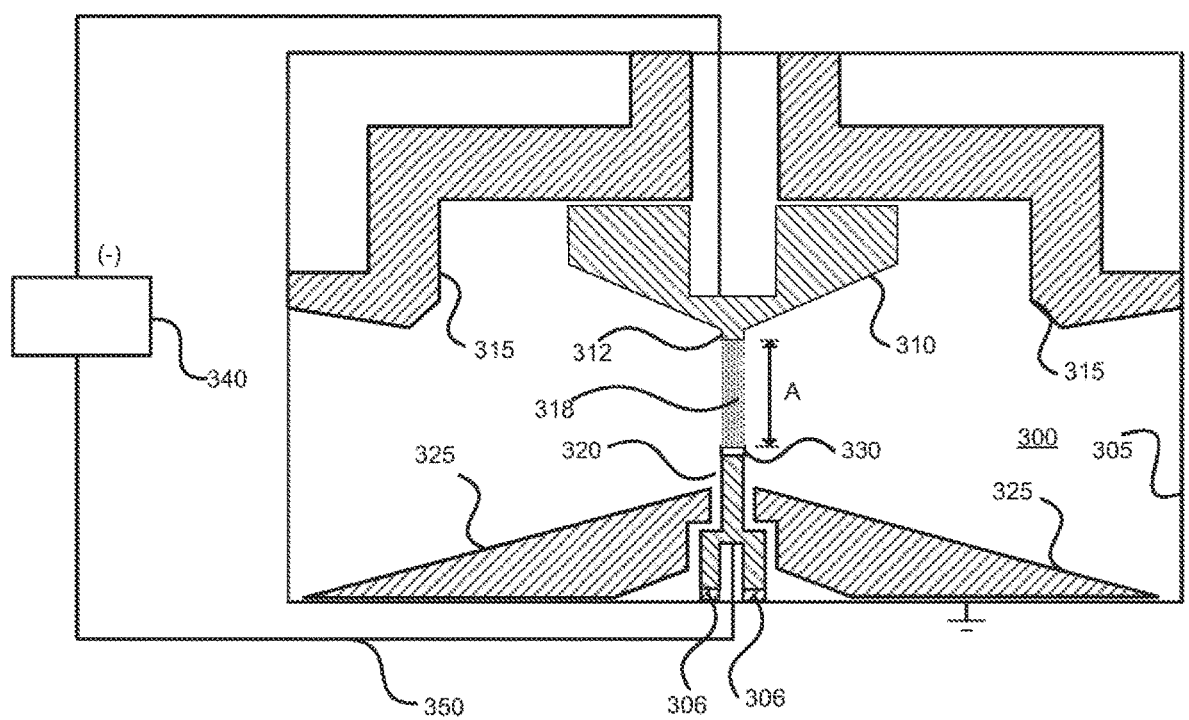
FIG. 3 is a diagrammatic cross section, not to scale, of a discharge chamber for an excimer laser according to aspects of the disclosed subject matter.

The PRA lasing chamber 200 and the MO 165 are configured as chambers in which electrical discharges between electrodes may cause lasing gas discharges in a lasing gas to create an inverted population of high energy molecules, including, e.g., argon, krypton, xenon, and/or fluorine, to produce relatively broad band radiation that may be line narrowed to a relatively very narrow bandwidth and center wavelength selected in the LNM 170, as is known in the art. A configuration for such a chamber 300 is shown in FIG. 3, which is a highly stylized cross-sectional diagram of a discharge chamber. A chamber 300 includes an upper electrode 310 acting as a cathode and a lower electrode 320 acting as an anode. One or both of the lower electrode 320 and the upper electrode 310 may be entirely contained in the pressure envelope of chamber 300 defined by the chamber wall 305 or one of the electrodes may not be so contained. Lasing gas discharges occur between these two electrodes in a gap having a width A. Also shown in FIG. 3 are an upper insulator 315 and a lower insulator 325. The lower electrode 320 is electrically connected to the wall 305 of the chamber 300 at tab 306. Thus, the lower electrode 320 is electrically connected to the upper half of the chamber 300. For safety reasons it is desirable to maintain the chamber wall 305 and so the lower electrode 320 at ground electrical potential. In the embodiment shown in FIG. 3, the upper electrode 310 is driven by a voltage supply 340 at a voltage which is negative with respect to the lower electrode 320.

When it is acting as an anode as shown in FIG. 3, the lower electrode 320 is beneficially made of a material which does not exhibit wear, but which in fact grows a corrosion coating 330 (also referred to as a "reef") that maintains the surface of the lower electrode 320 in substantially the same location as when the lower electrode 320 is new. Alternatively the electrode could be coated with an erosion resistant coating. The size of the coating 330 is exaggerated in FIG. 3 for illustration purposes. Alternatively, an extendable anode 320 moves vertically upward to compensate for the erosion loss from the anode 320. The grown version of the coating 330 does not form on the upper electrode 310 when it is acting as a cathode so that the upper electrode 310 erodes when the laser fires. Note also that the upper electrode 310 is provided with a small bump 312. In current chambers, this erosion leads to both an increase in size A of the discharge gap and broadening of the discharge, especially when vertical erosion of the electrode 310 causes the bump 312 to be completely eroded.

As mentioned, also shown in FIG. 3 is a voltage supply 340 which creates a pulse causing a discharge in the discharge gap between cathode 310 and anode 320. While the notation (−) is shown for the polarity of the output of the voltage supply 340 it will be understood that this is a relative rather than absolute polarity, that is, relative to the polarity of the lower electrode 320, which will generally be in electrical contact with ground (0) potential through a current return 350 and tabs 306. The current return 350 may be enclosed within the chamber 300 as shown below. The upper electrode (cathode 310) is charged to a large (~20 kV) negative voltage.

Figure 4A:
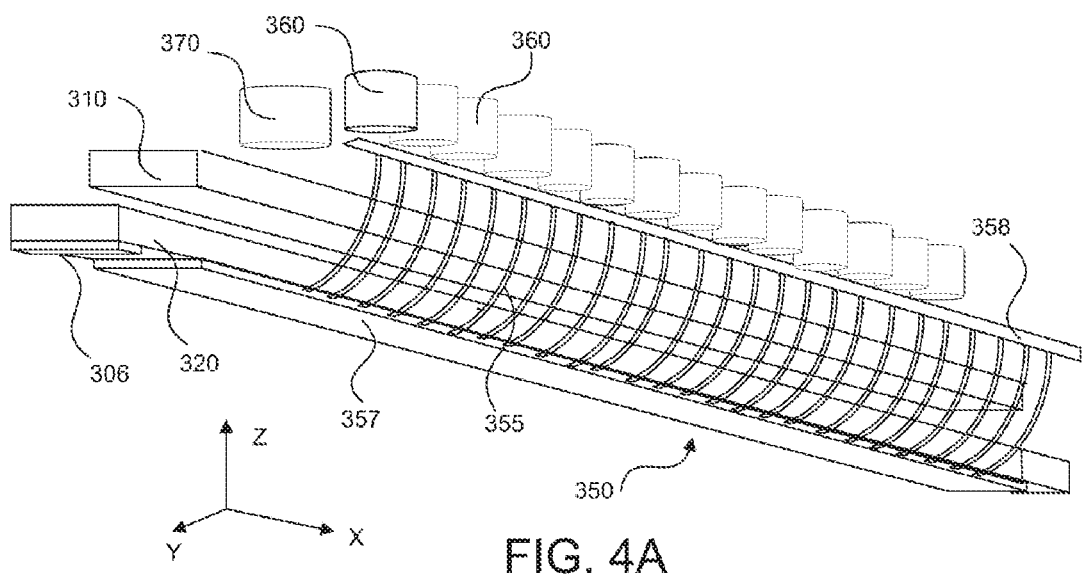
FIG. 4A is a perspective diagram of an arrangement of electrical components in a discharge chamber.
Figure 4B:
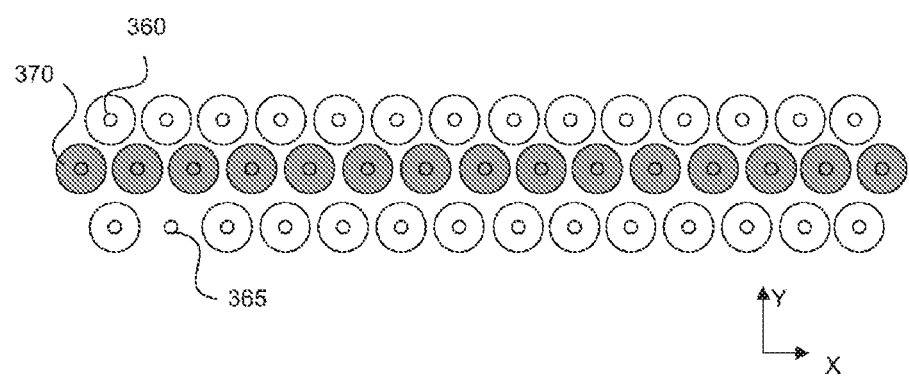
FIG. 4B is a plan diagram of a layout pattern for capacitors in a discharge chamber.

Although not shown in FIG. 3, one component of the power supply 340 is a bank of capacitors that create the pulse causing the discharge. The capacitors are placed close to the cathode 310 that create the pulse causing the discharge. This is shown in FIG. 4A, in which a row of capacitors 360 is positioned above a lengthwise half of the cathode 310. Although not shown in FIG. 4A, there is another row of capacitors 360 positioned above the other lengthwise half of the cathode 310. This is shown in FIG. 4B. Also shown in FIGS. 4A and 4B is a row of feedthrough assemblies 370 that convey electrical power from outside of the chamber 300 to its interior. The total design value of the peaking capacitance is thus achieved by two rows of parallel capacitors 360 laid out asymmetrically. It will be noted that the cathode 310 and the anode 320 are depicted in FIG. 4A as both having rectangular cross sections. This is merely to make the figure more readily understandable. One of ordinary skill will appreciate that in general these electrodes may each have any one of a number of shapes. The capacitors 360 are secured in sockets 365. FIG. 4B shows an empty socket 365.

Figure 6A:
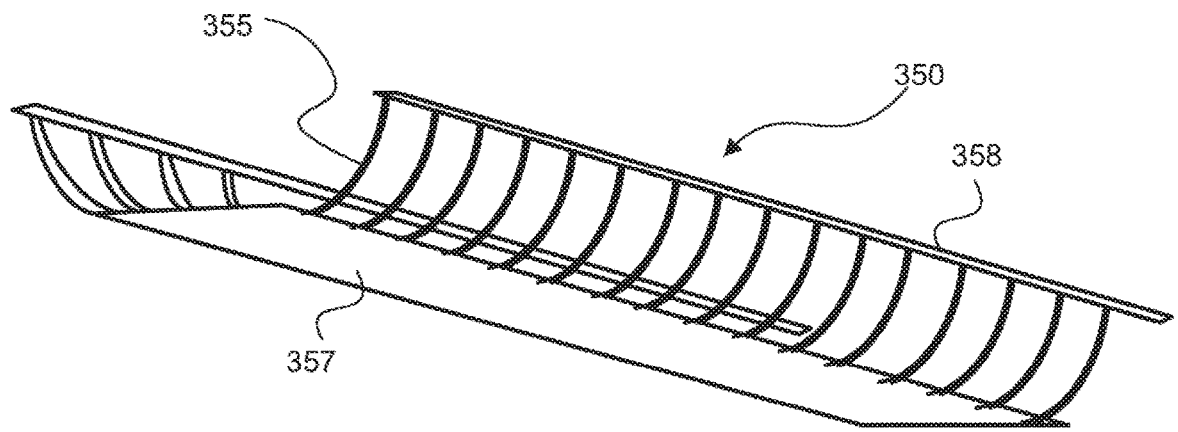
FIG. 6A is a perspective diagram of a current return for use in an electrical discharge chamber.

Also not shown in FIG. 3 is the "rib-cage" like structure for the current return 350. This is shown in FIG. 4A and FIG. 6A. A conventional current return 350 is made from evenly spaced, equally sized metal current return wires 355 as shown. The wires 355 are connected to a plate 357 underlying the anode 320. The wires 355 are also connected to a current bus 358. Also shown in FIG. 4A is one of the tabs 306 that electrically connects the end of the lower electrode 320 to the wall 305 of chamber 300.

Figure 5A:
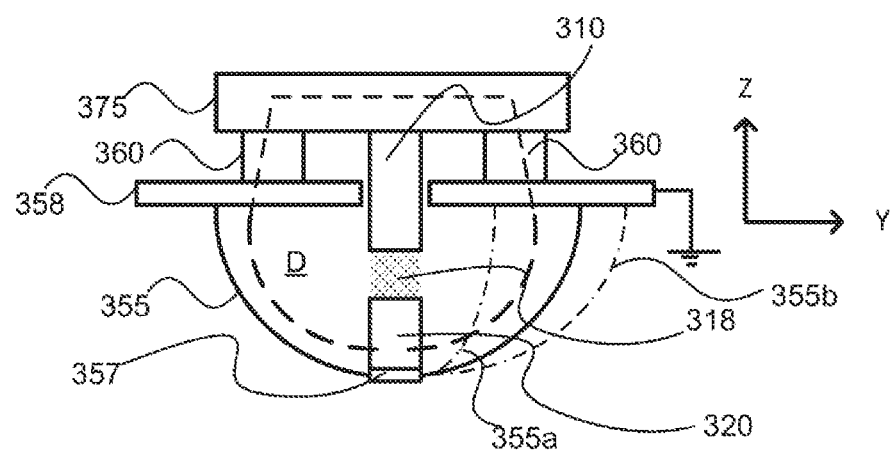
FIG. 5A is an end on view diagram of an arrangement of electrical components in a discharge chamber.

Although not shown in FIG. 4A, there is another row of wires connected to the other side of the plate 357 which are in turn connected to a current bus. Each wire 355 in one row is arranged symmetrically with a corresponding wire 355 in the other row so that the wires 355 are paired, with each pair enclosing a segment of the cathode 310, the discharge area, and the anode 320. This is shown in FIG. 5A which is a schematic cross section. High voltage feed 375 supplies voltage from the capacitors 360 to the cathode 310. When a discharge 318 occurs in the discharge gap between the cathode 310 and the anode 320, the current from the discharge 318 flows through the anode 320, the plate 357, the return wires 355, and the current bus 358 to ground. Each pair of return wires 355 brackets an area D of the cathode 310, anode 320, and discharge area 318. The tabs 306 are not visible in FIG. 5A but can be seen in FIG. 5B. FIG. 6A also shows the physical arrangement of the plate 357, return wires 355, and current bus 358.

Figure 5B:
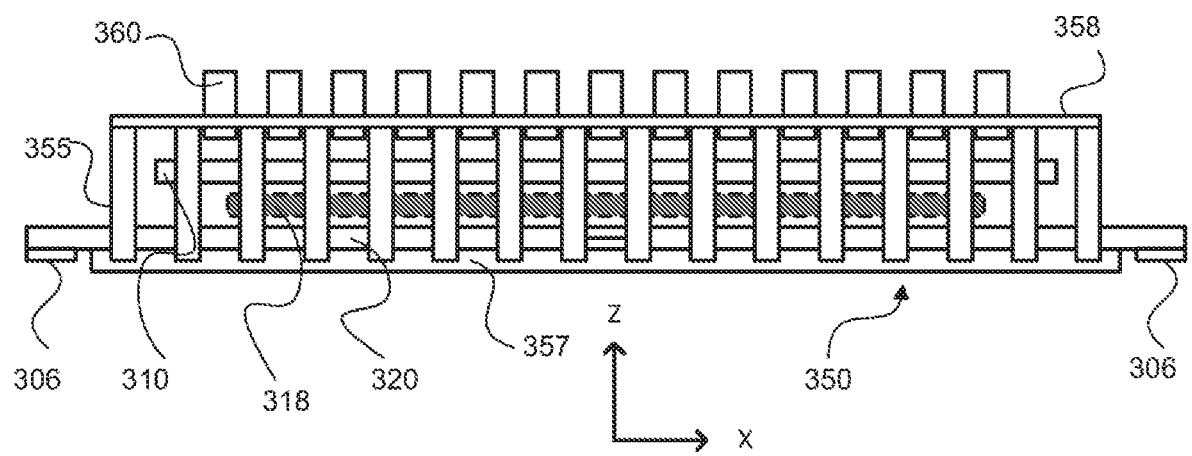
FIG. 5B is an side view diagram of an arrangement of electrical components in a discharge chamber.

In general, in a conventional design, the lengthwise extent of the current return 350 is independent of the length of actual discharge 318. The lengthwise extent of the current return 350 may be longer or shorter than the length of the actual discharge. For example, as shown in FIG. 5B, some of the pairs of wires 355 are positioned beyond the lengthwise ends of the discharge 318. In a conventional design, the area D bracketed by an opposed pair of current return wires 355 (depicted in FIG. 5A) (one in one row and its corresponding member in the other row) is the same along the length of the anode 320. Also in a conventional design, the distance between adjacent current return wires 355 in the same row (the pitch) is the same along the length of the anode 320, and the distance is chosen as an arbitrarily constant without tuning or optimization. The discharge is about 55 cm long, about 13.5 mm tall, and about 3 mm wide.

In short, in conventional designs, the chamber's internal geometry is not electrically tuned to the local level. Elements such as peaking capacitors and electrical current paths are designed in such a manner that the integral value enables fundamental overall chamber performance, but component selection and placement are not optimized locally. In addition, existing technology also includes a layout of peaking capacitors (Cpk) that is not electrically tuned for optimal discharge performance. Particularly, there may be a vacant socket on one side of the chamber (empty socket 365 in FIG. 4B).

In this new embodiment, the current return can be tuned with three categories of design variables, lengthwise extent and average spacing, local current return spacing, and delimited area.

Figure 6B:
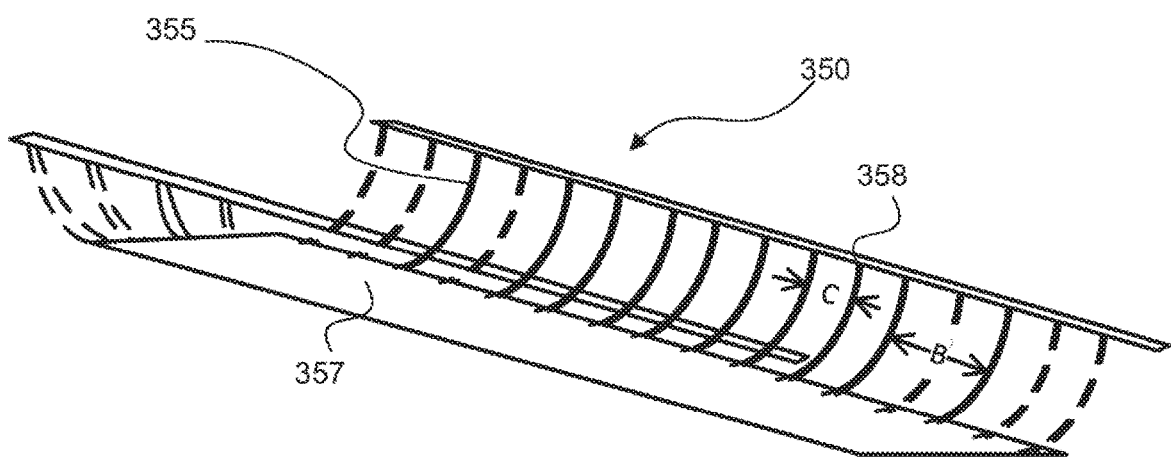
FIG. 6B is a perspective diagram of a current return incorporating aspects of an embodiment disclosed herein.

Considering these in turn, as regards lengthwise extent and average spacing, the lengthwise extent of the wires 355 may be selected so that, as shown in FIG. 5B and FIG. 6B, so that the discharge is optimized. Increasing or decreasing the length of the current return extent relative to the discharge will alter the local discharge current at the ends. An optimal current return extent length exists for the optimal local discharge.

As regards local current return spacing, the local spacing between particular current returns may be chosen so that the spacing of the remaining wires 355 is not all the same, with some wires 355 being separated by a gap having a wider spacing B and others being separated by a gap having a narrower spacing C, with B not being equal to C. Altering the width of the spacing changes the local discharge current.

As regards delimited area, in FIG. 5A, the area D is delimited by the current path including wires 355, anode 320, discharge 318, cathode 310, high voltage feed 375, and capacitors 360. The area D encompassing the electrical return path can be adjusted or "tuned" locally to affect the local discharge 318. For example, the current return wires 355 may be moved closer to or further away from the discharge 318 as shown by dashed wires 355a and 355b as shown in FIG. 5A, thus changing area D. This is shown in connection with the right-hand side of FIG. 5A but it will be understood that a similar reconfiguration can be done to the left hand side. The size of D affects the local discharge current. Therefore, the local current can be fine-tuned with variation of D.

With respect to the capacitors, the symmetry of their physical arrangement promotes improved discharge, especially near end-of-life operation. Thus, it is advantageous to arrange the capacitors to allow for symmetric capacitance distribution. This can be achieved by the use of capacitors having customized values and strategic placement of capacitors and vacancies to locally tune the capacitance in order to achieve locally optimized discharge.

Figure 7A:
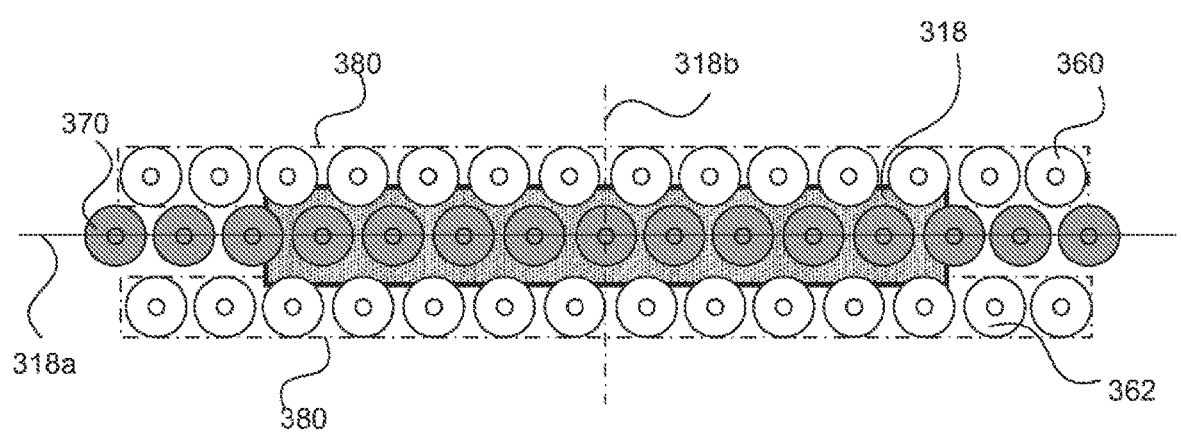
FIGS. 7A, 7B, and 7C are top view diagrams of a layout pattern for capacitors in a discharge chamber incorporating aspects of embodiments disclosed herein.

Compared with the design shown in FIG. 4B, FIGS. 7A, 7B, and 7C show other possible geometries. FIG. 7A shows a symmetrical arrangement in which a first row 380 of capacitors of 360 and a second row 382 of capacitors 362, each row having a like number (14 in the example in the figure but other numbers could be used) of capacitors, with the value of the capacitors being selected so that the total capacitance is the desired design value. The capacitors 360 and the capacitors 362 may all have the same value, in which case the capacitance of the arrangement will be distributed symmetrically with respect to a longitudinal axis 318a and a transverse axis 318b of the discharge region 318. Further, an arrangement having a different capacitance distribution can be achieved by using capacitors 360 that have a capacitance different from the capacitance of the capacitors 362, resulting in an arrangement in which capacitance is distributed asymmetrically with respect to the longitudinal axis 318a and symmetrically across the transverse axis 318b of the discharge region 318.

Figure 7B:
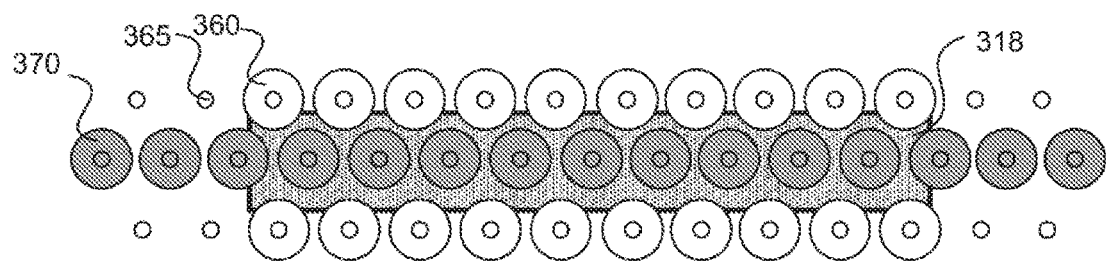

The arrangement is symmetrical with respect to the discharge region 318. FIG. 7B also shows an arrangement having a symmetrical arrangement in which two rows of capacitors, each row having a like number of capacitors, are used, with the value of the capacitors being selected so that the total capacitance is the desired design value. In the arrangement of FIG. 7B, however, fewer capacitors are used, each having a higher value so the same total capacitance can be achieved. Also, the arrangement of FIG. 7B has fewer capacitors beyond the discharge region 318.

Figure 7C:
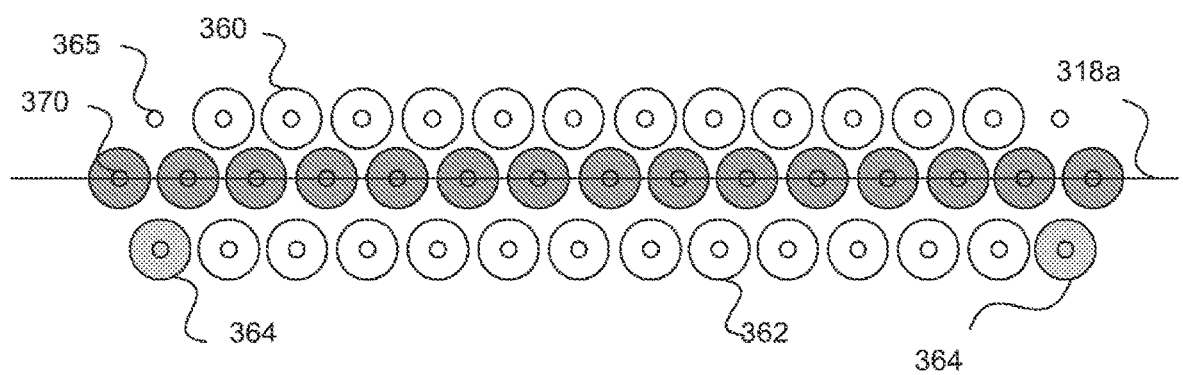

The arrangement of FIG. 7C features a row of capacitors 360 and a row of capacitors 362, with capacitors 364 at either end of the row of capacitors 362 having a capacitance that is different from that of the other capacitors 362 in the row. The arrangement of FIG. 7C is not symmetric across a longitudinal axis 318a of the discharge region 318 but is symmetric along the longitudinal axis 318a. The arrangement of FIG. 7C demonstrates the ability to tune capacitance by using fewer capacitors or using some capacitors having a first capacitance and some capacitors having a second capacitance different from the first capacitance.

Figure 8A:
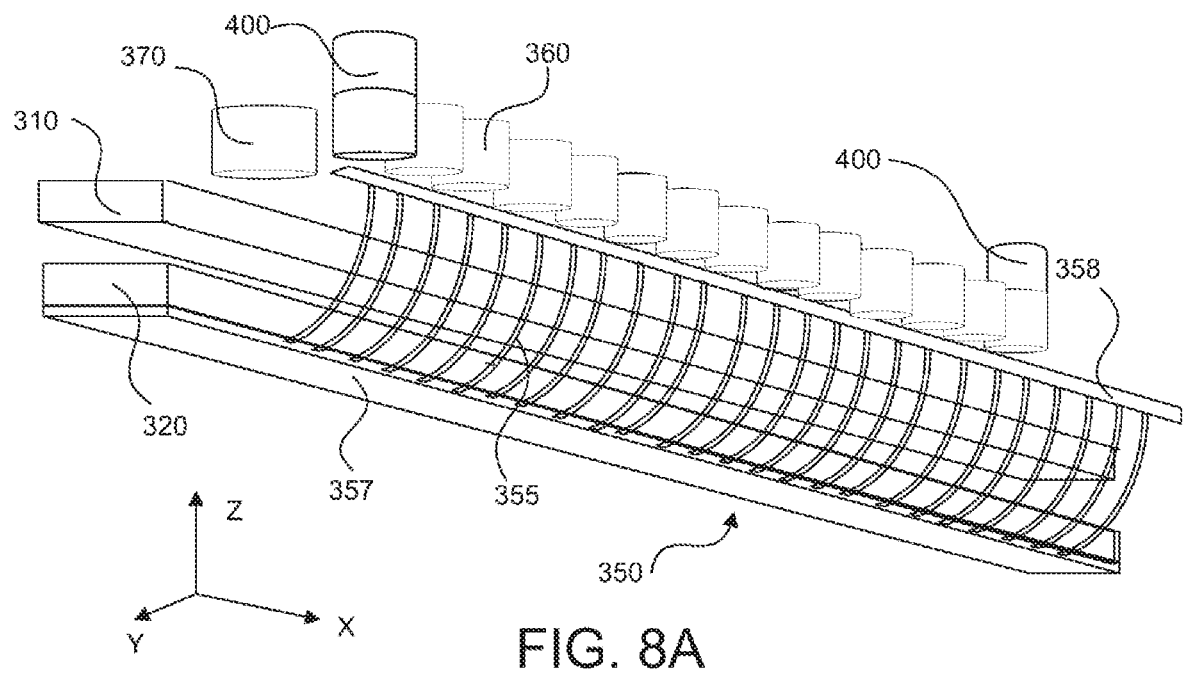
FIG. 8A is a perspective diagram of an arrangement of electrical components in a discharge chamber incorporating aspects of embodiments disclosed herein.
Figure 8B:
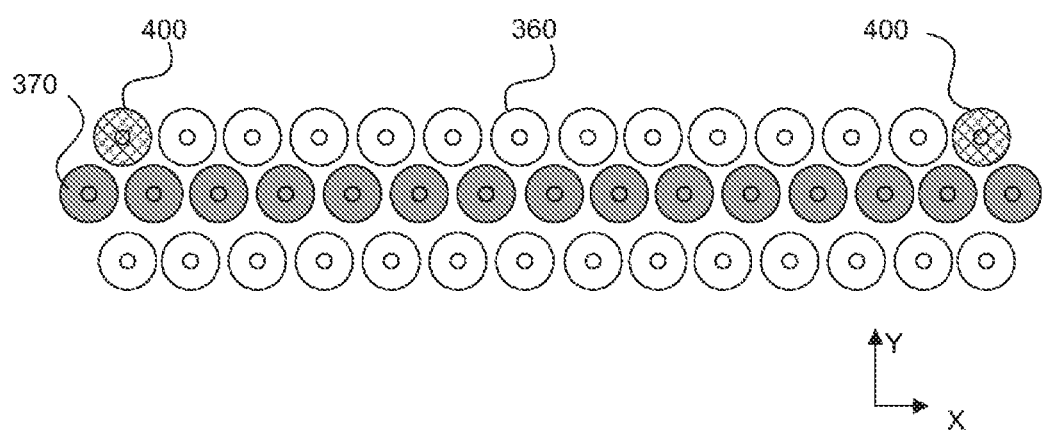
FIG. 8B is a top view diagram of a layout pattern for capacitors in a discharge chamber incorporating aspects of embodiments disclosed herein.

Additionally, two capacitors of the same individual capacitance, when connected in series, will exhibit half of the capacitance of each individual capacitor. Therefore, the symmetry of the design of FIG. 4B, where a total of 27 capacitors of the same value is used to achieve the desired total capacitance, can be improved by using two pairs of serially connected capacitors to achieve the same value of one single conventional capacitor. Such an arrangement is shown in FIGS. 8A and 8B. This results in a group 30 capacitors (26 capacitors 360 in parallel, 2 pairs 400 of serial capacitors also in parallel with the other 26) matching the total capacitance of 27 capacitors. The group of 30 then can be laid out symmetrically, with the two pairs 400 of serially stacked capacitors located symmetrically lengthwise of the discharge 318.

One of ordinary skill in the art will appreciate that the capacitance distribution as determined, for example, by the location of the capacitors, the location of the stacked capacitors, vacancies or capacitors of different values can be engineered and tuned for the best discharge performance and that the possible variants are not limited by the specific examples provided above.

Figure 9:
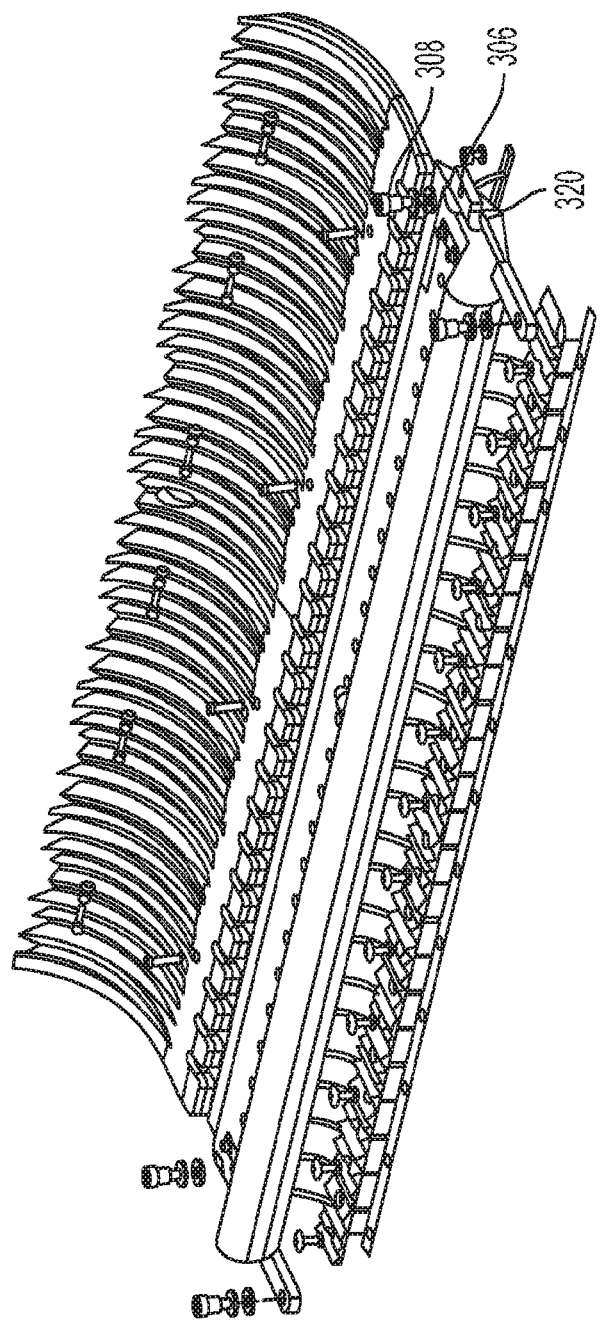
FIG. 9 is a perspective diagram of an arrangement of an electrode and electrode support structure incorporating aspects of embodiments disclosed herein.
Figure 10A:
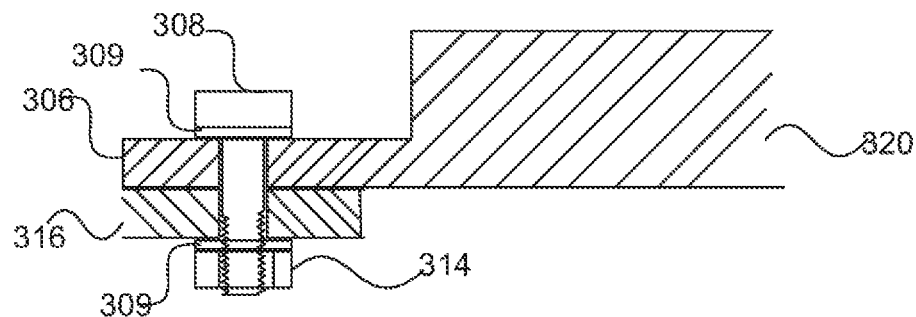
FIGS. 10A, 10B, and 10C are partially cutaway side views of systems for connecting an electrode to an electrode support incorporating aspects of embodiments disclosed herein.

Also, as shown in FIG. 9, the lower electrode 320 is supported by a tab 306 which is secured to the chamber 300, for example, by a fastener 308. In this regard see U.S. Pat. No. 7,995,637 issued Aug. 9, 2011, assigned to the assignee of the present application and hereby incorporated by reference in its entirety. Similarly, FIG. 10A shows the lower electrode 320 having a tab 306 connected to a support element 316 by a fastener 308, for example, a threaded bolt. Also shown as additional hardware such as washers 309 and a threaded nut 314 as may be needed or useful for securing the tab 306 to support element 316. The support element 316 is in turn connected to the chamber 300. In general, the tab 306 and fastener 308 are made of materials that establish an electrically conductive path from the ends of the lower electrode 320 to the chamber 300. It may, however, be advantageous to electrically isolate the ends of the lower electrode 320 from the chamber 300. In this regard see U.S. Patent Application Publication No. 2007/0071058, published issued Mar. 9, 2007, assigned to the assignee of the present application and hereby incorporated by reference in its entirety which proposes eliminating an anode support and chamber wall electrical current path to promote reefing. This current path may also be eliminated as a measure to spatially tune the chamber interior.

Figure 10B:
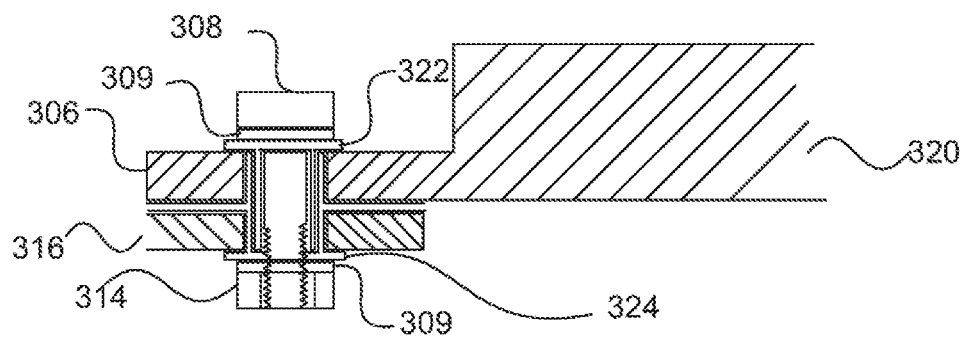
Figure 10C:
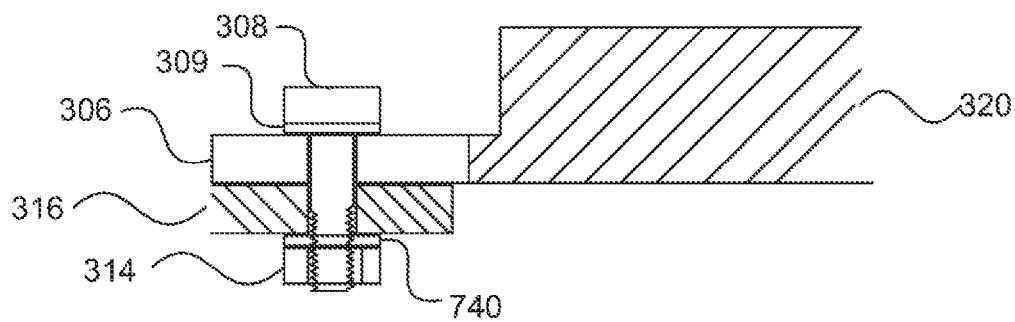

For example, as shown in FIG. 10B, the mechanical connection between the tab 306 and the support element 316 may be supplemented by an insert that electrically insulates the tab 306 from the support structure 316. FIG. 10B shows an insert made of an upper insert portion 322 and a lower insert portion 324 which cooperate to isolate the tab 306 from the support structure 316. FIG. 10C shows an arrangement in which the tab 306 is made of an insulating material such as a plastic or ceramic material. The plastic material may be polytetrafluoroethylene. Also, the fastener 308 may be made of an insulating material and an insulating layer may be placed between the tab 306 and the support element 316.

Figure 11A:
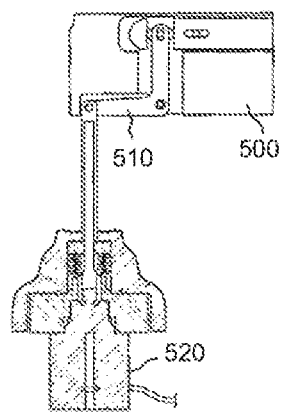
FIGS. 11A and 11B are partially cutaway side views of systems for positioning an electrode incorporating aspects of embodiments disclosed herein.
Figure 11B:
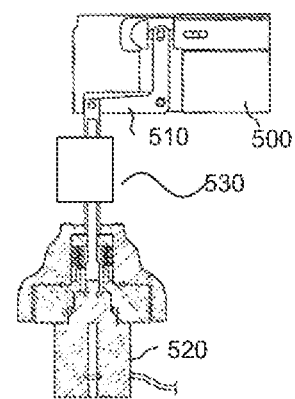

In some arrangements the end of the electrode 320 is connected to a mechanical linkage system for altering the vertical position of the electrode 320. In this regard see U.S. Pat. No. 8,526,481 issued Sep. 3, 2013 and U.S. Pat. No. 8,446,928 issued May 21, 2013, both assigned to the assignee of the present application and hereby incorporated by reference in their entirety. Such a system is shown in FIG. 11A, in which an electrode support bar 500 that supports the electrode 320 is raised and lowered by a lever 510 moved by an actuator 520. Again, typically, these components are made of materials that provide a conductive path from the end of the electrode 320 to the walls of the chamber 300. If, however, it is desired that the end of the electrode 320 by electrically isolated from the walls of the chamber 320, then this path can be interrupted, for example, by interposing an insulator 530, for example, between the lever 510 and the actuator 520.

Also, it is possible to avoid the need for any mechanical or electrical connection at the ends of the electrode 320 by devising other components in the system to provide the physical support for the electrode 320 that would otherwise be provided by mechanically fastening end tabs on the electrode. For example, referring again to FIG. 6A, the current return 350 could be made sufficiently physically strong to provide enough support for an electrode positioned on the plate 357 that the use of tabs can be avoided. As with the other measures, this would eliminate the short current return path through the tabs 306.

Thus, disclosed herein in a laser discharge chamber in which useful lifetime is extended by local electrical tuning using any one or a combination of measures including design of the chamber internal geometry, placement and distribution of components within the chamber such as electrodes, current returns, and capacitors, and selective electrical isolation of portions of the components.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Other aspects of the invention are set out in the following numbered clauses.

1. Apparatus comprising:
a discharge chamber;
a first electrode positioned in the discharge chamber;
a second electrode positioned in the discharge chamber to create an electrode gap having a height extending between the first and second electrode in a first direction and a length extending in a second direction transverse to the first direction between the first electrode and the second electrode; and
a plurality of conductive elements electrically connected to the second electrode, each of the plurality of conductive elements extending substantially in the first direction laterally of the electrode gap, the plurality of conductive elements being arranged in a row extending in the second direction, the plurality of conductive elements comprising a first pair of adjacent conductive elements spaced apart in the second direction at a first spacing and a second pair of adjacent conductive elements being spaced apart in the second direction at a second spacing, the second spacing being larger than the first spacing.

2. Apparatus as in clause 1 wherein the conductive elements of the plurality of conductive elements are positioned substantially symmetrically about a midline of the length of the electrode gap.

3. An apparatus as in clause 1 wherein the plurality of conductive elements comprises a first plurality of conductive elements, and further comprising a second plurality of conductive elements electrically connected to the second electrode, each of the second plurality of conductive elements extending substantially in the first direction laterally of the electrode gap on a side of the electrode gap opposite to the first plurality of conductive elements, the second plurality of conductive elements being arranged in a second row extending in the second direction, the second plurality of conductive elements comprising third pair of adjacent conductive elements spaced apart in the second direction at the first spacing and a fourth pair of adjacent conductive elements spaced apart in the second direction at the second spacing.

4. Apparatus as in clause 3 wherein the conductive elements of the first plurality of conductive elements are positioned substantially symmetrically about a midline of the length of the electrode gap and the conductive elements of the second plurality of conductive elements are positioned substantially symmetrically about the midpoint of the length of the electrode gap.

5. Apparatus as in clause 2 wherein the first pair of adjacent conductive elements is positioned across the electrode gap from the first pair of adjacent conductive elements.

6. Apparatus as in clause 2 wherein a length of the first row and a length of the second row are substantially coextensive with the length of the electrode gap.

7. Apparatus as in clause 1 wherein the lateral ends of the second electrode are electrically isolated.

8. Apparatus as in clause 7 wherein the discharge chamber comprises walls and the lateral ends of the second electrode are electrically isolated from the walls of the discharge chamber.

9. Apparatus as in clause 7 further comprising a mechanical linkage mechanically coupled to the second electrode and arranged to move the second electrode wherein the mechanical linkage comprises an insulating element arranged to electrically isolate the second electrode.

10. Apparatus as in clause 1 wherein the plurality of conductive elements electrically connected to the second electrode is arranged to support the second electrode.

11. Apparatus comprising:
a discharge chamber;
a first electrode positioned in the discharge chamber, the first electrode having a first electrode length extending in a first direction;
a second electrode positioned in the discharge chamber, the second electrode having a second electrode length extending in the first direction, the second electrode being arranged in a spaced-apart relation to the first electrode to define an electrode gap between the first electrode and the second electrode;
a first plurality of capacitors electrically connected to the first electrode and arranged in a first row extending in the first direction; and
a second plurality of capacitors electrically connected to the first electrode and arranged in a second row extending in the first direction parallel to the first row,
wherein a number of capacitors in the first plurality is the same as a number of capacitors in the second plurality.

12. Apparatus as in clause 11 wherein the capacitors of the first plurality of capacitors are positioned substantially symmetrically about a midline of the length of the electrode gap.

13. Apparatus as in clause 12 wherein the capacitors of the second plurality of capacitors are positioned substantially symmetrically about a midline of the length of the electrode gap.

14. Apparatus as in clause 11 wherein the lateral ends of the second electrode are electrically isolated from the walls of the discharge chamber.

15. Apparatus as in clause 11 further comprising a plurality of conductive elements electrically connected to the second electrode and arranged to support the second electrode.

16. Apparatus comprising:
a discharge chamber;
a first electrode positioned in the discharge chamber, the first electrode having a first electrode length extending in a first direction;
a second electrode positioned in the discharge chamber, the second electrode having a second electrode length extending in the first direction, the second electrode being arranged in a spaced-apart relation to the first electrode to define an electrode gap between the first electrode and the second electrode; and
a plurality of capacitive elements electrically connected to the first electrode and arranged in a first row extending in the first direction, at least one of the capacitive elements in the plurality of capacitive elements having a capacitance value different from at least one other capacitive elements in the plurality of capacitive elements.

17. Apparatus as in clause 16 wherein at least one of the capacitive elements comprises a pair of capacitors connected in parallel.

18. Apparatus comprising:
a discharge chamber;
a first electrode positioned in the discharge chamber, the first electrode having a first electrode length extending in a first direction;
a second electrode positioned in the discharge chamber, the second electrode having a second electrode length extending in the first direction and being arranged in a spaced-apart relation to the first electrode to define an electrode gap between the first electrode and the second electrode; and
a first row of a first number X of capacitors electrically connected to the first electrode and arranged in a first row in a first row direction substantially parallel to the first electrode length;
a second row of a second number Y of capacitors electrically connected to the first electrode and arranged in a second row in a second row direction substantially parallel to the first electrode length;
wherein X and Y are at least 4 and X is less than Y and wherein a capacitance value of a first capacitor in the second row and a last capacitor in the second row are equal to each other and less than the capacitance value of capacitors in a remainder of the second row.

19. Apparatus comprising:
a discharge chamber;
a first electrode positioned in the discharge chamber;
a second electrode positioned in the discharge chamber to create an electrode gap having a height extending between the first and second electrode in a first direction and a length extending in a second direction transverse to the first direction between the first electrode and the second electrode;
a first plurality of conductive elements electrically connected to the second electrode, each of the plurality of conductive elements extending substantially in the first direction laterally of the electrode gap, the plurality of conductive elements being arranged in a row extending in the second direction, the plurality of conductive elements comprising a first pair of adjacent conductive elements spaced apart in the second direction at a first spacing and a second pair of adjacent conductive elements being spaced apart in the second direction at a second spacing, the second spacing being larger than the first spacing,
second plurality of conductive elements electrically connected to the second electrode, each of the second plurality of conductive elements extending substantially in the first direction laterally of the electrode gap on a side of the electrode gap opposite to the first plurality of conductive elements, the second plurality of conductive elements being arranged in a second row extending in the second direction, the second plurality of conductive elements comprising a third pair of adjacent conductive elements spaced apart in the second direction at the first spacing and a fourth pair of adjacent conductive elements spaced apart in the second direction at the second spacing;
a first plurality of capacitors electrically connected to the first electrode and arranged in a first row extending in the first direction; and
a second plurality of capacitors electrically connected to the first electrode and arranged in a second row extending in the first direction parallel to the first row, at least one of the capacitors in the second plurality of capacitors having a capacitance value different from at least one other capacitor in the second plurality of capacitors.

20. Apparatus as in clause 19 wherein the first pair of adjacent conductive elements is positioned across the electrode gap from the third pair of adjacent conductive elements.

21. Apparatus as in clause 19 wherein a length of the first row and a length of the second row are substantially coextensive with the length of the electrode gap.

22. Apparatus as in clause 19 wherein the conductive elements of the first plurality of conductive elements are positioned substantially symmetrically about a midline of the length of the electrode gap.

23. Apparatus as in clause 19 wherein the conductive elements of the first plurality of conductive elements are positioned substantially symmetrically about a midline of the length of the electrode gap and the conductive elements of the second plurality of conductive elements are positioned substantially symmetrically about the midpoint of the length of the electrode gap.

24. Apparatus as in clause 23 wherein the capacitors of the first plurality of capacitors are positioned substantially symmetrically about a midline of the length of the electrode gap.

25. Apparatus as in clause 23 wherein the capacitors of the second plurality of capacitors are positioned substantially symmetrically about a midline of the length of the electrode gap.

26. Apparatus as in clause 23 wherein the capacitors of the first plurality of capacitors are positioned substantially symmetrically about a midline of the length of the electrode gap.

27. Apparatus as in clause 19 wherein the capacitors of the second plurality of capacitors are positioned substantially symmetrically about a midline of the length of the electrode gap.

28. Apparatus as in clause 19 wherein the lateral ends of the second electrode are electrically isolated.

29. Apparatus as in clause 19 wherein the first and second plurality of conductive elements are arranged to support the second electrode.

The invention claimed is:

1. An apparatus comprising:
a discharge chamber;
a first electrode positioned in the discharge chamber;
a second electrode positioned in the discharge chamber to create an electrode gap having a height extending between the first and second electrode in a first direction and a length extending in a second direction transverse to the first direction between the first electrode and the second electrode; and
a plurality of conductive elements electrically connected to the second electrode, each of the plurality of conductive elements extending substantially in the first direction laterally of the electrode gap, the plurality of conductive elements being arranged in a row extending in the second direction, the plurality of conductive elements comprising a first pair of adjacent conductive elements spaced apart in the second direction at a first spacing and a second pair of adjacent conductive elements being spaced apart in the second direction at a second spacing, the second spacing being larger than the first spacing.

2. The apparatus as in claim 1 wherein the conductive elements of the plurality of conductive elements are positioned substantially symmetrically about a midline of the length of the electrode gap.

3. The apparatus as in claim 1 wherein the plurality of conductive elements comprises a first plurality of conductive elements, and further comprising a second plurality of conductive elements electrically connected to the second electrode, each of the second plurality of conductive elements extending substantially in the first direction laterally of the electrode gap on a side of the electrode gap opposite to the first plurality of conductive elements, the second plurality of conductive elements being arranged in a second row extending in the second direction, the second plurality of conductive elements comprising third pair of adjacent conductive elements spaced apart in the second direction at the first spacing and a fourth pair of adjacent conductive elements spaced apart in the second direction at the second spacing.

4. The apparatus as in claim 3 wherein the conductive elements of the first plurality of conductive elements are positioned substantially symmetrically about a midline of the length of the electrode gap and the conductive elements of the second plurality of conductive elements are positioned substantially symmetrically about the midpoint of the length of the electrode gap.

5. The apparatus as in claim 2 wherein the first pair of adjacent conductive elements is positioned across the electrode gap from the first pair of adjacent conductive elements.

6. The apparatus as in claim 2 wherein a length of the first row and a length of the second row are substantially coextensive with the length of the electrode gap.

7. The apparatus as in claim 1 wherein the lateral ends of the second electrode are electrically isolated.

8. The apparatus as in claim 7 wherein the discharge chamber comprises walls and the lateral ends of the second electrode are electrically isolated from the walls of the discharge chamber.

9. The apparatus as in claim 7 further comprising a mechanical linkage mechanically coupled to the second electrode and arranged to move the second electrode wherein the mechanical linkage comprises an insulating element arranged to electrically isolate the second electrode.

10. The apparatus as in claim 1 wherein the plurality of conductive elements electrically connected to the second electrode is arranged to support the second electrode.

11. An apparatus comprising:
a discharge chamber;
a first electrode positioned in the discharge chamber, the first electrode having a first electrode length extending in a first direction;
a second electrode positioned in the discharge chamber, the second electrode having a second electrode length extending in the first direction, the second electrode being arranged in a spaced-apart relation to the first electrode to define an electrode gap between the first electrode and the second electrode;

a first plurality of capacitors electrically connected to the first electrode and arranged in a first row extending in the first direction; and a second plurality of capacitors electrically connected to the first electrode and arranged in a second row extending in the first direction parallel to the first row, wherein capacitors at either end of the second plurality of capacitors have a capacitance that is different from that of the other capacitors in the second row.

12. The apparatus as in claim 11 wherein the capacitors of the first plurality of capacitors are positioned substantially symmetrically about a midline of the length of the electrode gap.

13. The apparatus as in claim 12 wherein the capacitors of the second plurality of capacitors are positioned substantially symmetrically about a midline of the length of the electrode gap.

14. The apparatus as in claim 11 wherein the lateral ends of the second electrode are electrically isolated from the walls of the discharge chamber.

15. The apparatus as in claim 11 further comprising a plurality of conductive elements electrically connected to the second electrode and arranged to support the second electrode.

16. An apparatus comprising:
a discharge chamber;
a first electrode positioned in the discharge chamber, the first electrode having a first electrode length extending in a first direction;
a second electrode positioned in the discharge chamber, the second electrode having a second electrode length extending in the first direction, the second electrode being arranged in a spaced-apart relation to the first electrode to define an electrode gap between the first electrode and the second electrode; and
a plurality of capacitive elements electrically connected to the first electrode and arranged in a first row extending in the first direction, at least one of the capacitive elements in the plurality of capacitive elements having a capacitance value different from at least one other capacitive elements in the plurality of capacitive elements.

17. The apparatus as in claim 16 wherein at least one of the capacitive elements comprises a pair of capacitors connected in parallel.

18. An apparatus comprising:
a discharge chamber;
a first electrode positioned in the discharge chamber, the first electrode having a first electrode length extending in a first direction;
a second electrode positioned in the discharge chamber, the second electrode having a second electrode length extending in the first direction and being arranged in a spaced-apart relation to the first electrode to define an electrode gap between the first electrode and the second electrode; and
a first row of a first number X of capacitors electrically connected to the first electrode and arranged in a first row in a first row direction substantially parallel to the first electrode length;
a second row of a second number Y of capacitors electrically connected to the first electrode and arranged in a second row in a second row direction substantially parallel to the first electrode length;
wherein X and Y are at least 4 and X is less than Y and wherein a capacitance value of a first capacitor in the second row and a last capacitor in the second row are equal to each other and less than the capacitance value of capacitors in a remainder of the second row.

19. An apparatus comprising:
a discharge chamber;
a first electrode positioned in the discharge chamber;
a second electrode positioned in the discharge chamber to create an electrode gap having a height extending between the first and second electrode in a first direction and a length extending in a second direction transverse to the first direction between the first electrode and the second electrode;
a first plurality of conductive elements electrically connected to the second electrode, each of the plurality of conductive elements extending substantially in the first direction laterally of the electrode gap, the plurality of conductive elements being arranged in a row extending in the second direction, the plurality of conductive elements comprising a first pair of adjacent conductive elements spaced apart in the second direction at a first spacing and a second pair of adjacent conductive elements being spaced apart in the second direction at a second spacing, the second spacing being larger than the first spacing,
second plurality of conductive elements electrically connected to the second electrode, each of the second plurality of conductive elements extending substantially in the first direction laterally of the electrode gap on a side of the electrode gap opposite to the first plurality of conductive elements, the second plurality of conductive elements being arranged in a second row extending in the second direction, the second plurality of conductive elements comprising a third pair of adjacent conductive elements spaced apart in the second direction at the first spacing and a fourth pair of adjacent conductive elements spaced apart in the second direction at the second spacing;
a first plurality of capacitors electrically connected to the first electrode and arranged in a first row extending in the first direction; and
a second plurality of capacitors electrically connected to the first electrode and arranged in a second row extending in the first direction parallel to the first row, at least one of the capacitors in the second plurality of capacitors having a capacitance value different from at least one other capacitor in the second plurality of capacitors.

20. The apparatus as in claim 19 wherein the first pair of adjacent conductive elements is positioned across the electrode gap from the third pair of adjacent conductive elements.

21. The apparatus as in claim 19 wherein a length of the first row and a length of the second row are substantially coextensive with the length of the electrode gap.

22. The apparatus as in claim 19 wherein the conductive elements of the first plurality of conductive elements are positioned substantially symmetrically about a midline of the length of the electrode gap.

23. The apparatus as in claim 19 wherein the conductive elements of the first plurality of conductive elements are positioned substantially symmetrically about a midline of the length of the electrode gap and the conductive elements of the second plurality of conductive elements are positioned substantially symmetrically about the midpoint of the length of the electrode gap.

24. The apparatus as in claim 23 wherein the capacitors of the first plurality of capacitors are positioned substantially symmetrically about a midline of the length of the electrode gap.

25. The apparatus as in claim 23 wherein the capacitors of the second plurality of capacitors are positioned substantially symmetrically about a midline of the length of the electrode gap.

26. The apparatus as in claim 23 wherein the capacitors of the first plurality of capacitors are positioned substantially symmetrically about a midline of the length of the electrode gap.

27. The apparatus as in claim 19 wherein the capacitors of the second plurality of capacitors are positioned substantially symmetrically about a midline of the length of the electrode gap.

28. The apparatus as in claim 19 wherein the lateral ends of the second electrode are electrically isolated.

29. The apparatus as in claim 19 wherein the first and second plurality of conductive elements are arranged to support the second electrode.

* * * * *